(12) United States Patent
Chu et al.

(10) Patent No.: US 11,018,898 B2
(45) Date of Patent: *May 25, 2021

(54) MULTICAST MULTIPATHING IN AN OVERLAY NETWORK

(71) Applicant: Cisco Technology, Inc., San Jose, CA (US)

(72) Inventors: Kit Chiu Chu, Fremont, CA (US); Thomas J. Edsall, Los Gatos, CA (US); Navindra Yadav, Cupertino, CA (US); Francisco M. Matus, Saratoga, CA (US); Krishna Doddapaneni, Sunnyvale, CA (US); Satyam Sinha, Sunnyvale, CA (US); Sameer Merchant, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/846,091

(22) Filed: Apr. 10, 2020

(65) Prior Publication Data
US 2020/0244483 A1    Jul. 30, 2020

Related U.S. Application Data

(63) Continuation of application No. 15/482,437, filed on Apr. 7, 2017, now Pat. No. 10,623,206, which is a (Continued)

(51) Int. Cl.
*H04L 12/46*    (2006.01)
*H04L 12/707*   (2013.01)
(Continued)

(52) U.S. Cl.
CPC .......... *H04L 12/4633* (2013.01); *H04L 12/18* (2013.01); *H04L 12/4641* (2013.01);
(Continued)

(58) Field of Classification Search
CPC . H04L 12/18; H04L 12/4633; H04L 12/4645; H04L 12/4641; H04L 45/24;
(Continued)

(56) References Cited

U.S. PATENT DOCUMENTS 4,298,770 A    11/1981  Nishihara et al.
4,636,919 A    1/1987   Itakura et al.
(Continued)

FOREIGN PATENT DOCUMENTS

| WO | WO 2006/101668 | 9/2006 |
| WO | WO 2009/115480 | 9/2009 |
| WO | WO 2014/071996 | 5/2014 |

OTHER PUBLICATIONS

International Search Report and Written Opinion from the International Searching Authority, dated Feb. 5, 2015, for corresponding International Patent Application No. PCT/US2014/063555.
(Continued)

*Primary Examiner* — Michael C Lai
(74) *Attorney, Agent, or Firm* — Polsinelli PC

(57) ABSTRACT

The subject technology addresses a need for improving utilization of network bandwidth in a multicast network environment. More specifically, the disclosed technology provides solutions for extending multipathing to tenant multicast traffic in an overlay network, which enables greater bandwidth utilization for multicast traffic. In some aspects, nodes in the overlay network can be connected by virtual or logical links, each of which corresponds to a path, perhaps through many physical links, in the underlying network.

20 Claims, 8 Drawing Sheets

Related U.S. Application Data continuation of application No. 14/508,779, filed on Oct. 7, 2014, now Pat. No. 9,654,385.

(60) Provisional application No. 61/900,333, filed on Nov. 5, 2013.

(51) Int. Cl.

| | | |
|---|---|---|
| *H04L 12/709* | (2013.01) | |
| *H04L 12/723* | (2013.01) | |
| *H04L 12/26* | (2006.01) | |
| *H04L 12/741* | (2013.01) | |
| *H04L 29/12* | (2006.01) | |
| *H04L 12/751* | (2013.01) | |
| *H04L 29/06* | (2006.01) | |
| *H04L 12/58* | (2006.01) | |
| *H04L 29/08* | (2006.01) | |
| *H04L 12/24* | (2006.01) | |
| *H04L 12/931* | (2013.01) | |
| *H04L 12/18* | (2006.01) | |
| *H04L 12/753* | (2013.01) | |
| *H04L 12/743* | (2013.01) | |
| *H04L 12/755* | (2013.01) | |
| *H04L 12/715* | (2013.01) | |
| *H04L 12/803* | (2013.01) | |

(52) U.S. Cl.
CPC ...... *H04L 12/4645* (2013.01); *H04L 41/0654* (2013.01); *H04L 43/0811* (2013.01); *H04L 43/0852* (2013.01); *H04L 43/0894* (2013.01); *H04L 43/16* (2013.01); *H04L 45/02* (2013.01); *H04L 45/021* (2013.01); *H04L 45/22* (2013.01); *H04L 45/24* (2013.01); *H04L 45/245* (2013.01); *H04L 45/48* (2013.01); *H04L 45/50* (2013.01); *H04L 45/74* (2013.01); *H04L 45/745* (2013.01); *H04L 45/7453* (2013.01); *H04L 49/70* (2013.01); *H04L 51/14* (2013.01); *H04L 61/2503* (2013.01); *H04L 61/2592* (2013.01); *H04L 67/10* (2013.01); *H04L 69/22* (2013.01); *H04L 45/64* (2013.01); *H04L 47/125* (2013.01); *H04L 2212/00* (2013.01)

(58) Field of Classification Search
CPC ..... H04L 45/48; H04L 45/64; H04L 45/7453; H04L 2212/00; H04L 41/0654; H04L 43/0811; H04L 43/0852; H04L 43/0894; H04L 43/16; H04L 45/02; H04L 45/021; H04L 45/22; H04L 45/245; H04L 45/28; H04L 45/50; H04L 45/74; H04L 45/745; H04L 47/125; H04L 49/70; H04L 51/14; H04L 61/2503; H04L 61/2592; H04L 67/10; H04L 69/22

See application file for complete search history.

(56) References Cited

U.S. PATENT DOCUMENTS

| | | | |
|---|---|---|---|
| 4,700,016 A | 10/1987 | Hitchcock et al. | |
| 5,115,431 A | 5/1992 | Williams et al. | |
| 5,859,835 A | 1/1999 | Varma et al. | |
| 5,926,458 A | 7/1999 | Yin et al. | |
| 6,230,231 B1 * | 5/2001 | DeLong | H04L 12/4641 711/200 |
| 6,389,031 B1 | 5/2002 | Chao et al. | |
| 6,677,831 B1 | 1/2004 | Cheng et al. | |
| 6,714,553 B1 | 3/2004 | Poole et al. | |
| 6,757,897 B1 | 6/2004 | Shi et al. | |
| 6,769,033 B1 * | 7/2004 | Bass | G06F 15/80 709/246 |
| 6,876,952 B1 | 4/2005 | Kappler et al. | |
| 6,907,039 B2 | 6/2005 | Shen | |
| 6,941,649 B2 | 9/2005 | Goergen | |
| 6,952,421 B1 | 10/2005 | Slater | |
| 6,954,463 B1 | 10/2005 | Ma et al. | |
| 6,996,099 B1 | 2/2006 | Kadambi et al. | |
| 7,068,667 B2 | 6/2006 | Foster et al. | |
| 7,152,117 B1 | 12/2006 | Stapp et al. | |
| 7,177,946 B1 | 2/2007 | Kaluve et al. | |
| 7,372,857 B1 | 5/2008 | Kappler et al. | |
| 7,379,459 B2 | 5/2008 | Ohnishi | |
| 7,411,915 B1 | 8/2008 | Spain et al. | |
| 7,426,604 B1 | 9/2008 | Rygh et al. | |
| 7,516,211 B1 | 4/2009 | Gourlay et al. | |
| 7,539,131 B2 | 5/2009 | Shen | |
| 7,580,409 B1 | 8/2009 | Swenson et al. | |
| 7,630,368 B2 | 12/2009 | Tripathi et al. | |
| 7,729,296 B1 | 6/2010 | Choudhary | |
| 7,742,406 B1 * | 6/2010 | Muppala | H04L 41/5022 370/230 |
| 7,826,469 B1 | 11/2010 | Li et al. | |
| 7,940,763 B1 * | 5/2011 | Kastenholz | H04L 12/2856 370/255 |
| 8,190,843 B1 | 5/2012 | de Forest et al. | |
| 8,233,384 B2 | 7/2012 | Osterhout et al. | |
| 8,302,301 B2 | 11/2012 | Lau | |
| 8,325,459 B2 | 12/2012 | Mutnury et al. | |
| 8,339,973 B1 | 12/2012 | Pichumani et al. | |
| 8,378,223 B1 | 2/2013 | Shiue et al. | |
| 8,442,063 B1 | 5/2013 | Zhou et al. | |
| 8,514,712 B1 | 8/2013 | Aswadhati | |
| 8,687,629 B1 | 4/2014 | Kompella et al. | |
| 8,868,766 B1 | 10/2014 | Theimer et al. | |
| 8,874,876 B2 * | 10/2014 | Bhadra | H04L 49/356 370/392 |
| 8,908,691 B2 | 12/2014 | Biswas et al. | |
| 9,036,481 B1 | 5/2015 | White | |
| 9,053,070 B1 | 6/2015 | Arguelles | |
| 9,106,508 B2 | 8/2015 | Banavalikar et al. | |
| 9,178,715 B2 | 11/2015 | Jain et al. | |
| 9,197,551 B2 | 11/2015 | DeCusatis et al. | |
| 9,203,188 B1 | 12/2015 | Siechen et al. | |
| 9,258,195 B1 | 2/2016 | Pendleton et al. | |
| 9,325,524 B2 | 4/2016 | Banavalikar et al. | |
| 9,374,294 B1 | 6/2016 | Pani | |
| 9,402,470 B2 | 8/2016 | Shen et al. | |
| 9,407,501 B2 | 8/2016 | Yadav et al. | |
| 9,426,060 B2 | 8/2016 | Dixon et al. | |
| 9,433,081 B1 | 8/2016 | Xiong et al. | |
| 9,444,634 B2 | 9/2016 | Pani | |
| 9,502,111 B2 | 11/2016 | Dharmapurikar et al. | |
| 9,509,092 B2 | 11/2016 | Shen et al. | |
| 9,544,185 B1 | 1/2017 | Yadav et al. | |
| 9,544,224 B2 | 1/2017 | Chu et al. | |
| 9,590,914 B2 | 3/2017 | Attar et al. | |
| 9,627,063 B2 | 4/2017 | Dharmapurikar et al. | |
| 9,634,846 B2 | 4/2017 | Pani | |
| 9,635,937 B2 | 5/2017 | Shen et al. | |
| 9,654,300 B2 | 5/2017 | Pani | |
| 9,654,385 B2 | 5/2017 | Chu et al. | |
| 9,654,409 B2 | 5/2017 | Yadav et al. | |
| 9,655,232 B2 | 5/2017 | Saxena et al. | |
| 9,667,431 B2 | 5/2017 | Pani | |
| 9,667,551 B2 | 5/2017 | Edsall et al. | |
| 9,674,086 B2 | 6/2017 | Ma et al. | |
| 9,686,180 B2 | 6/2017 | Chu et al. | |
| 9,698,994 B2 | 7/2017 | Pani | |
| 9,716,665 B2 | 7/2017 | Attar et al. | |
| 9,742,673 B2 | 8/2017 | Banerjee et al. | |
| 9,755,965 B1 | 9/2017 | Yadav et al. | |
| 9,769,078 B2 | 9/2017 | Attar et al. | |
| 9,876,715 B2 | 1/2018 | Edsall et al. | |
| 2002/0126671 A1 | 9/2002 | Ellis et al. | |
| 2002/0136268 A1 | 9/2002 | Gan et al. | |
| 2002/0146026 A1 | 10/2002 | Unitt et al. | |
| 2003/0035385 A1 | 2/2003 | Walsh et al. | |
| 2003/0058837 A1 | 3/2003 | Denney et al. | |

(56) References Cited

U.S. PATENT DOCUMENTS

| | | |
|---|---|---|
| 2003/0058860 A1 | 3/2003 | Kunze et al. |
| 2003/0067924 A1 | 4/2003 | Choe et al. |
| 2003/0097461 A1 | 5/2003 | Barham et al. |
| 2003/0115319 A1 | 6/2003 | Dawson et al. |
| 2003/0123462 A1 | 7/2003 | Kusayanagi |
| 2003/0137940 A1 | 7/2003 | Schwartz et al. |
| 2003/0142629 A1 | 7/2003 | Krishnamurthi et al. |
| 2003/0174650 A1 | 9/2003 | Shankar et al. |
| 2003/0223376 A1 | 12/2003 | Elliott et al. |
| 2003/0231646 A1 | 12/2003 | Chandra et al. |
| 2004/0062259 A1 | 4/2004 | Jeffries et al. |
| 2004/0073715 A1 | 4/2004 | Folkes et al. |
| 2004/0100901 A1 | 5/2004 | Bellows |
| 2004/0103310 A1 | 5/2004 | Sobel et al. |
| 2004/0111507 A1 | 6/2004 | Villado et al. |
| 2004/0160956 A1 | 8/2004 | Hardy et al. |
| 2004/0249960 A1 | 12/2004 | Hardy et al. |
| 2005/0007961 A1 | 1/2005 | Scott et al. |
| 2005/0013280 A1 | 1/2005 | Buddhikot et al. |
| 2005/0073958 A1 | 4/2005 | Atlas et al. |
| 2005/0091239 A1 | 4/2005 | Ward et al. |
| 2005/0175020 A1 | 8/2005 | Park et al. |
| 2005/0201375 A1 | 9/2005 | Komatsu et al. |
| 2005/0207410 A1 | 9/2005 | Adhikari et al. |
| 2005/0213504 A1 | 9/2005 | Enomoto et al. |
| 2005/0232227 A1 | 10/2005 | Jorgenson et al. |
| 2006/0028285 A1 | 2/2006 | Jang et al. |
| 2006/0031643 A1 | 2/2006 | Figueira |
| 2006/0075093 A1 | 4/2006 | Frattura et al. |
| 2006/0083179 A1 | 4/2006 | Mitchell |
| 2006/0083256 A1 | 4/2006 | Mitchell |
| 2006/0182036 A1 | 8/2006 | Sasagawa et al. |
| 2006/0183488 A1 | 8/2006 | Billhartz |
| 2006/0198315 A1 | 9/2006 | Sasagawa et al. |
| 2006/0209688 A1 | 9/2006 | Tsuge et al. |
| 2006/0209702 A1 | 9/2006 | Schmitt et al. |
| 2006/0215572 A1 | 9/2006 | Padhye et al. |
| 2006/0215623 A1 | 9/2006 | Lin et al. |
| 2006/0221835 A1 | 10/2006 | Sweeney |
| 2006/0239204 A1 | 10/2006 | Bordonaro et al. |
| 2006/0250982 A1 | 11/2006 | Yuan et al. |
| 2006/0268742 A1 | 11/2006 | Chu et al. |
| 2006/0274657 A1 | 12/2006 | Olgaard et al. |
| 2006/0280179 A1 | 12/2006 | Meier |
| 2006/0285500 A1 | 12/2006 | Booth, III et al. |
| 2007/0016590 A1 | 1/2007 | Appleby et al. |
| 2007/0025241 A1 | 2/2007 | Nadeau et al. |
| 2007/0053303 A1 | 3/2007 | Kryuchkov |
| 2007/0058557 A1 | 3/2007 | Cuffaro et al. |
| 2007/0061451 A1 | 3/2007 | Villado et al. |
| 2007/0076605 A1 | 4/2007 | Cidon et al. |
| 2007/0091795 A1 | 4/2007 | Bonaventure et al. |
| 2007/0097872 A1 | 5/2007 | Chiu |
| 2007/0133566 A1 | 6/2007 | Copps |
| 2007/0159987 A1 | 7/2007 | Khan et al. |
| 2007/0160073 A1 | 7/2007 | Toumura et al. |
| 2007/0211625 A1 | 9/2007 | Liu et al. |
| 2007/0223372 A1 | 9/2007 | Haalen et al. |
| 2007/0233847 A1 | 10/2007 | Aldereguia et al. |
| 2007/0258382 A1 | 11/2007 | Foll et al. |
| 2007/0258383 A1 | 11/2007 | Wada |
| 2007/0274229 A1 | 11/2007 | Scholl et al. |
| 2007/0280264 A1 | 12/2007 | Milton et al. |
| 2008/0031130 A1 | 2/2008 | Raj et al. |
| 2008/0031146 A1 | 2/2008 | Kwak et al. |
| 2008/0031247 A1 | 2/2008 | Tahara et al. |
| 2008/0092213 A1 | 4/2008 | Wei et al. |
| 2008/0147830 A1 | 6/2008 | Ridgill et al. |
| 2008/0151863 A1 | 6/2008 | Lawrence et al. |
| 2008/0177896 A1 | 7/2008 | Quinn et al. |
| 2008/0219173 A1 | 9/2008 | Yoshida et al. |
| 2008/0225853 A1 | 9/2008 | Melman et al. |
| 2008/0243495 A1 | 10/2008 | Anandakumar et al. |
| 2008/0259809 A1 | 10/2008 | Stephan et al. |
| 2008/0259925 A1 | 10/2008 | Droms et al. |
| 2008/0310421 A1 | 12/2008 | Teisberg et al. |
| 2009/0052332 A1 | 2/2009 | Fukuyama et al. |
| 2009/0086629 A1 | 4/2009 | Zhang et al. |
| 2009/0094357 A1 | 4/2009 | Keohane et al. |
| 2009/0103566 A1 | 4/2009 | Kloth et al. |
| 2009/0116402 A1 | 5/2009 | Yamasaki |
| 2009/0122805 A1 | 5/2009 | Epps et al. |
| 2009/0188711 A1 | 7/2009 | Ahmad |
| 2009/0193103 A1 | 7/2009 | Small et al. |
| 2009/0225671 A1 | 9/2009 | Arbel et al. |
| 2009/0232011 A1 | 9/2009 | Li et al. |
| 2009/0238179 A1 | 9/2009 | Samprathi |
| 2009/0268614 A1 | 10/2009 | Tay et al. |
| 2009/0271508 A1 | 10/2009 | Sommers et al. |
| 2010/0128619 A1 | 5/2010 | Shigei |
| 2010/0150155 A1 | 6/2010 | Napierala |
| 2010/0189080 A1 | 7/2010 | Hu et al. |
| 2010/0191813 A1 | 7/2010 | Gandhewar et al. |
| 2010/0191839 A1 | 7/2010 | Gandhewar et al. |
| 2010/0223655 A1 | 9/2010 | Zheng |
| 2010/0260197 A1 | 10/2010 | Martin et al. |
| 2010/0287227 A1 | 11/2010 | Goel et al. |
| 2010/0299553 A1 | 11/2010 | Cen |
| 2010/0312875 A1 | 12/2010 | Wilerson et al. |
| 2011/0007638 A1 | 1/2011 | Xu et al. |
| 2011/0110241 A1 | 5/2011 | Atkinson et al. |
| 2011/0138310 A1 | 6/2011 | Gomez et al. |
| 2011/0158248 A1 | 6/2011 | Vorunganti et al. |
| 2011/0170426 A1 | 7/2011 | Kompella et al. |
| 2011/0203834 A1 | 8/2011 | Yoneya et al. |
| 2011/0213894 A1 | 9/2011 | Silberstein et al. |
| 2011/0228795 A1 | 9/2011 | Agrawal et al. |
| 2011/0249682 A1 | 10/2011 | Kean et al. |
| 2011/0268118 A1* | 11/2011 | Schlansker ......... H04L 12/4641 370/392 |
| 2011/0274053 A1 | 11/2011 | Baik et al. |
| 2011/0286324 A1 | 11/2011 | Bellagamba et al. |
| 2011/0286447 A1 | 11/2011 | Liu |
| 2011/0299406 A1 | 12/2011 | Vobbilisetty et al. |
| 2011/0310738 A1 | 12/2011 | Lee et al. |
| 2011/0321031 A1 | 12/2011 | Dournov et al. |
| 2012/0007688 A1 | 1/2012 | Zhou et al. |
| 2012/0063318 A1 | 3/2012 | Boddu et al. |
| 2012/0102114 A1 | 4/2012 | Dunn et al. |
| 2012/0147752 A1 | 6/2012 | Ashwood-Smith et al. |
| 2012/0163396 A1 | 6/2012 | Cheng et al. |
| 2012/0195233 A1 | 8/2012 | Wang et al. |
| 2012/0275304 A1 | 11/2012 | Patel et al. |
| 2012/0281697 A1 | 11/2012 | Huang |
| 2012/0300787 A1 | 11/2012 | Korger |
| 2012/0314581 A1 | 12/2012 | Rajamanickam et al. |
| 2013/0055155 A1 | 2/2013 | Wong et al. |
| 2013/0090014 A1 | 4/2013 | Champion |
| 2013/0097335 A1 | 4/2013 | Jiang et al. |
| 2013/0100810 A1 | 4/2013 | Slothouber |
| 2013/0107889 A1 | 5/2013 | Barabash et al. |
| 2013/0121172 A1 | 5/2013 | Cheng et al. |
| 2013/0124708 A1 | 5/2013 | Lee et al. |
| 2013/0155846 A1 | 6/2013 | Ramachandran et al. |
| 2013/0182712 A1 | 7/2013 | Aguayo et al. |
| 2013/0227108 A1 | 8/2013 | Dunbar et al. |
| 2013/0250951 A1 | 9/2013 | Koganti |
| 2013/0311637 A1 | 11/2013 | Kamath et al. |
| 2013/0311663 A1 | 11/2013 | Kamath et al. |
| 2013/0311991 A1 | 11/2013 | Li et al. |
| 2013/0322258 A1 | 12/2013 | Nedeltchev et al. |
| 2013/0322446 A1 | 12/2013 | Biswas et al. |
| 2013/0322453 A1 | 12/2013 | Allan |
| 2013/0332399 A1 | 12/2013 | Reddy et al. |
| 2013/0332577 A1 | 12/2013 | Nakil et al. |
| 2013/0332602 A1 | 12/2013 | Nakil et al. |
| 2014/0006549 A1 | 1/2014 | Narayanaswamy et al. |
| 2014/0016501 A1 | 1/2014 | Kamath et al. |
| 2014/0043535 A1 | 2/2014 | Motoyama et al. |
| 2014/0043972 A1 | 2/2014 | Li et al. |
| 2014/0047264 A1 | 2/2014 | Wang et al. |
| 2014/0050223 A1 | 2/2014 | Foo et al. |
| 2014/0056298 A1 | 2/2014 | Vobbilisetty et al. |
| 2014/0064278 A1 | 3/2014 | Santos et al. |

(56) References Cited

U.S. PATENT DOCUMENTS

| | | |
|---|---|---|
| 2014/0064281 A1 | 3/2014 | Basso et al. |
| 2014/0068750 A1 | 3/2014 | Tjahjono et al. |
| 2014/0086253 A1 | 3/2014 | Yong |
| 2014/0105039 A1 | 4/2014 | Mcdysan |
| 2014/0105062 A1 | 4/2014 | Mcdysan et al. |
| 2014/0105216 A1 | 4/2014 | Mcdysan |
| 2014/0146817 A1 | 5/2014 | Zhang |
| 2014/0146824 A1 | 5/2014 | Angst et al. |
| 2014/0201375 A1 | 7/2014 | Beereddy et al. |
| 2014/0219275 A1 | 8/2014 | Allan et al. |
| 2014/0241353 A1 | 8/2014 | Zhang et al. |
| 2014/0244779 A1 | 8/2014 | Roitshtein et al. |
| 2014/0269705 A1 | 9/2014 | DeCusatis et al. |
| 2014/0269710 A1 | 9/2014 | Sundaram et al. |
| 2014/0269712 A1 | 9/2014 | Kidambi |
| 2014/0307744 A1 | 10/2014 | Dunbar et al. |
| 2014/0321277 A1 | 10/2014 | Lynn, Jr. et al. |
| 2014/0328206 A1 | 11/2014 | Chan et al. |
| 2014/0334295 A1 | 11/2014 | Guichard et al. |
| 2014/0341029 A1 | 11/2014 | Allan et al. |
| 2014/0372582 A1 | 12/2014 | Ghanwani et al. |
| 2015/0009992 A1 | 1/2015 | Zhang |
| 2015/0010001 A1 | 1/2015 | Duda et al. |
| 2015/0058470 A1 | 2/2015 | Duda |
| 2015/0073920 A1 | 3/2015 | Pashkevich et al. |
| 2015/0082418 A1 | 3/2015 | Gu |
| 2015/0092551 A1 | 4/2015 | Moisand et al. |
| 2015/0092593 A1 | 4/2015 | Kompella |
| 2015/0103679 A1 | 4/2015 | Tessmer et al. |
| 2015/0113143 A1 | 4/2015 | Stuart et al. |
| 2015/0124590 A1 | 5/2015 | Chu et al. |
| 2015/0124629 A1 | 5/2015 | Pani |
| 2015/0124631 A1 | 5/2015 | Edsall et al. |
| 2015/0124633 A1 | 5/2015 | Banerjee et al. |
| 2015/0124640 A1 | 5/2015 | Chu et al. |
| 2015/0124644 A1 | 5/2015 | Pani |
| 2015/0124806 A1 | 5/2015 | Banerjee et al. |
| 2015/0124817 A1 | 5/2015 | Merchant et al. |
| 2015/0124821 A1 | 5/2015 | Chu et al. |
| 2015/0124822 A1 | 5/2015 | Chu et al. |
| 2015/0124823 A1 | 5/2015 | Pani et al. |
| 2015/0124824 A1 | 5/2015 | Edsall et al. |
| 2015/0124825 A1 | 5/2015 | Dharmapurikar et al. |
| 2015/0124833 A1 | 5/2015 | Ma et al. |
| 2015/0127797 A1 | 5/2015 | Attar et al. |
| 2015/0188769 A1 | 7/2015 | Gu |
| 2015/0222516 A1 | 8/2015 | Deval et al. |
| 2015/0236900 A1 | 8/2015 | Chung |
| 2015/0378712 A1 | 12/2015 | Cameron et al. |
| 2015/0378969 A1 | 12/2015 | Powell et al. |
| 2016/0036697 A1 | 2/2016 | DeCusatis et al. |
| 2016/0119204 A1 | 4/2016 | Murasato et al. |
| 2016/0315811 A1 | 10/2016 | Yadav et al. |
| 2017/0085469 A1 | 3/2017 | Chu et al. |
| 2017/0207961 A1 | 7/2017 | Saxena et al. |
| 2017/0237651 A1 | 8/2017 | Pani |
| 2017/0237678 A1 | 8/2017 | Ma et al. |
| 2017/0250912 A1 | 8/2017 | Chu et al. |
| 2017/0346748 A1 | 11/2017 | Attar et al. |

OTHER PUBLICATIONS

International Preliminary Report on Patentability from PCT Application No. PCT/US2014/063555 dated May 10, 2016.

Aslam, Faisal, et al., "NPP: A Facility Based Computation Framework for Restoration Routing Using Aggregate Link Usage Information," Proceedings of QoS-IP: quality of service in multiservice IP network, Feb. 2005, pp. 150-163.

Chandy, K. Mani, et al., "Distribution Snapshots: Determining Global States of Distributed Systems," ACM Transaction on Computer Systems, Feb. 1985, vol. 3, No. 1, pp. 63-75.

Cisco Systems, Inc. Cisco Nexus 1000V VXLAN Configuration Guide, Release 4.2(1)SV2(2.1), Chapter 1, Information About VXLANs, Jun. 21, 2013, 6 pages.

Khasnabish, Bhumip, et al., "Mobility and Interconnection of Virtual Machines and Virtual Network Elements; draft-khasnabish-vmmi-problems-03.txt," Network Working Group, Dec. 30, 2012, pp. 1-29.

Kodialam, Murali, et. al, "Dynamic Routing of Locally Restorable Bandwidth Guaranteed Tunnels using Aggregated Link Usage Information," Proceedings of IEEE INFOCOM, 2001, vol. 1, pp. 376-385.

Li, Li, et. al, "Routing Bandwidth Guaranteed Paths with Local Restoration in Label Switched Networks," IEEE Journal on Selected Areas in Communications, Feb. 7, 2005, vol. 23, No. 2, pp. 1-11.

Mahalingam, M., et al. "VXLAN: A Framework for Overlaying Virtualized Layer 2 Networks over Layer 3 Networks," VXLAN, Internet Engineering Task Force, Internet Draft, located at https://tools.ietf._org/html/draft-mahalingam-dutt-dcops-vxlan-06, Oct. 2013, pp. 1-24.

Moncaster, T., et al., "The Need for Congestion Exposure in the Internet", Oct. 26, 2009, Internet-Draft, pp. 1-22.

Narten, T., et al., "Problem Statement: Overlays for Network Virtualization," draft-ietf-nvo3-overlay-problem-statement-04, Internet Engineering Task Force, Jul. 31, 2013, pp. 1-24.

Onisick, Joe, "VXLAN Deep Dive," Genesis Framework, Wordpress, Nov. 6, 2012, 8 pages.

Pan, P., et. al, "Fast Reroute Extensions to RSVP-TE for LSP Tunnels," RFC-4090. May 2005, pp. 1-38.

Raza, Saqib, et al., "Online Routing of Bandwidth Guaranteed Paths with Local Restoration using Optimized Aggregate Usage Information," IEEE-ICC '05 Communications, May 2005, vol. 1, 8 pages.

Sinha, Shan, et al., "Harnessing TCP's Burstiness with Flowlet Switching," Nov. 2004, 6 pages.

VMware, Inc., "VMware Network Virtualization Design Guide, Technical White Paper," Jan. 2013, 25 pages.

* cited by examiner

MULTICAST MULTIPATHING IN AN OVERLAY NETWORK

CLAIM TO PRIORITY

This application is a continuation of U.S. Pat. No. 10,623,206 filed on Apr. 7, 2017, which is a continuation of U.S. Pat. No. 9,654,385 filed on Oct. 7, 2014, which claims priority to U.S. Provisional Patent Application Ser. No. 61/900,333 filed on Nov. 5, 2013, the contents of which are incorporated by reference in their entireties.

BACKGROUND

Multipathing allows a source to utilize multiple paths to forward packet(s) toward its destination. Multipathing allows traffic to utilize available bandwidth in the network, and has been used extensively for IP unicast forwarding. Even though one can achieve similar bandwidth utilization benefits by extending multipathing to multicast, support for multipathing for multicast has been lacking because multicast forwarding involves putting traffic on a multicast group into a distribution tree in which the traffic must strictly follow in order to avoid loops.

BRIEF DESCRIPTION OF THE DRAWINGS

The embodiments of the present technology will hereinafter be described in conjunction with the appended drawings, provided to illustrate and not to limit the technology, wherein like designations denote like elements, and in which.

DETAILED DESCRIPTION

Figure 1:
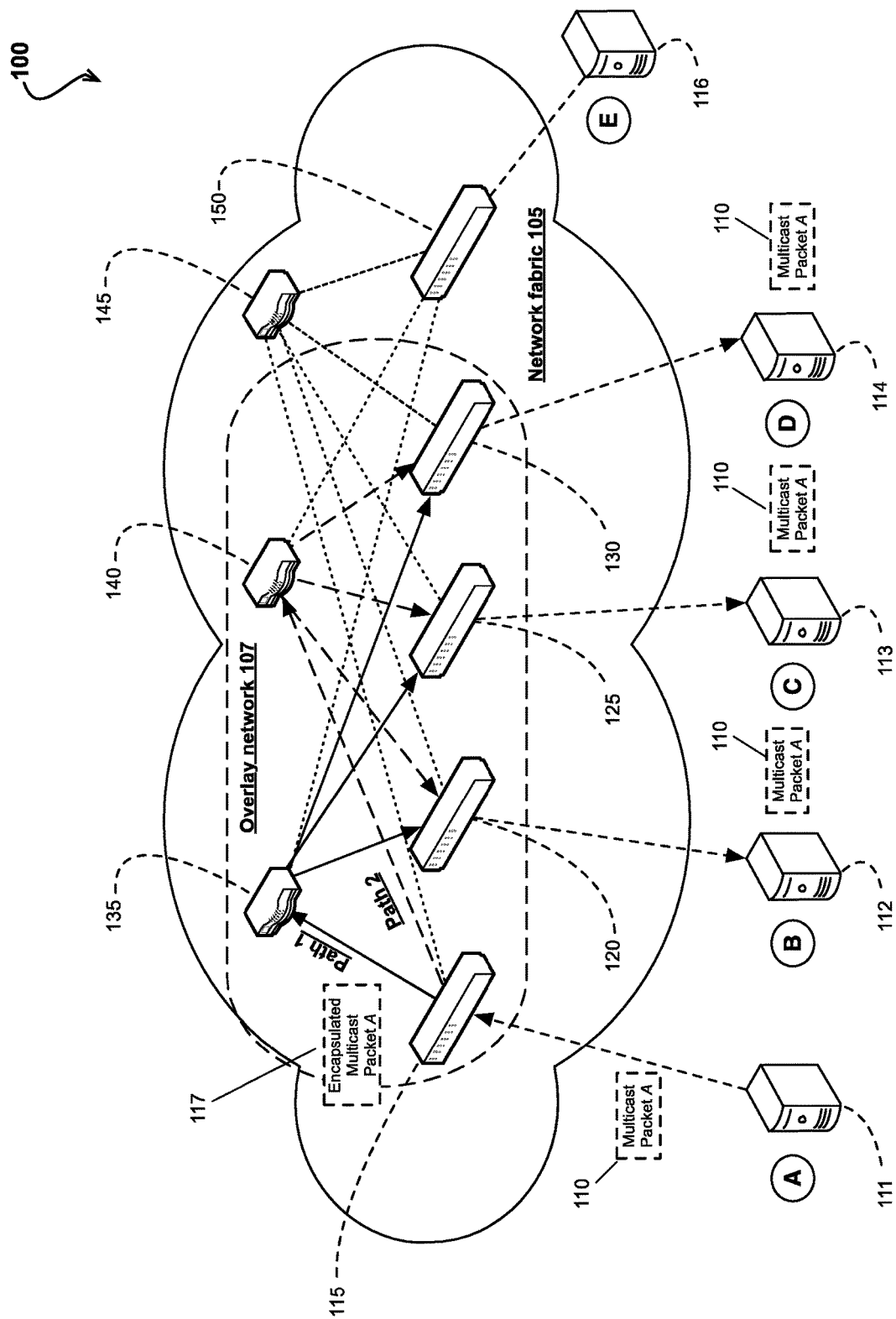
FIG. 1 shows an example network environment including several network elements or nodes (e.g., network devices such as switches, routers, servers, storage device, etc.) in accordance with some embodiments of the subject technology.

Systems and methods in accordance with various embodiments of the present disclosure may overcome one or more deficiencies experienced in existing approaches to managing multicast traffic throughout an overlay network.

Overview

Embodiments of the subject technology provide for receiving, over a network interface at an ingress leaf switch, a multicast packet for distributing over an overlay network. A hash operation or algorithm is performed on at least a portion of the multicast packet to determine a hash key. Based at least on the hash key, a forwarding tag (FTAG) value is selected. An overlay multicast group value is then concatenated with the FTAG value to provide a destination address. The multicast packet is encapsulated with the concatenated overlay multicast group value and the FTAG value. The encapsulated multicast packet is forwarded to a network element or device located at a next-hop from the ingress leaf switch.

Description of Example Embodiments

The disclosed technology addresses the need in the art for improving utilization of network bandwidth in a multicast network environment. More specifically, the disclosed technology addresses the need in the art for extending multipathing to tenant multicast traffic in an IP overlay network, which enables the network to fully utilize available bandwidth for multicast traffic. As used herein, an overlay network is a computer network that is built on the top of another network (e.g., underlying network). In some examples, nodes in the overlay network may be connected by virtual or logical links, each of which corresponds to a path, perhaps through many physical links, in the underlying network.

Examples of Multicast Multipathing in an Overlay Network

Embodiments to support multicast multipathing in an overlay network fabric is described in the following details.

Digital communications networks, such as local or wide area networks (LANs, WANs), the Internet, etc., are networks for permitting information stored at one location to be distributed to one or more users situated at geographically different locations. The information (also referred to herein as a "message" or "packet" or "datagram") can take any of a number of forms including, but not limited to, text, still image, audio, and video information.

Digital communications networks may operate under the principal of point-to-point or connection-oriented communications (e.g., utilizing TCP/IP) in which information may be exchanged between one sending device and one receiving device. This manner of connectivity ensures reliability by establishing a connection between each and every receiving device using a connection based protocol. Unique connections are formed with each device if communication with multiple receiver devices is desired. However, the overhead incurred with creating and managing a connection between a sending device and a number of receiving devices may be prohibitively expensive when a large number of receiving devices are included.

Connectionless protocols have been developed for reducing the overhead associated with connection based protocols, such as UDP (user datagram protocol) over an IP network. Under a connectionless communication between two network end points, a message can be sent from one end point to another without prior arrangement. A computing device at one end of the communication transmits data addressed to the other, without first ensuring that the receiver is available and ready to receive the data. These connectionless protocols may rely on a broadcast or "multicast" model where a single message is broadcast to a multiple receiving devices without forming a connection with the individual systems. Multicasting enables a source to transmit messages to multiple receivers that have been collectively identified by a single IP destination address, rather than to each of the receivers' unique IP address individually.

In at least one embodiment, routing of data for multicasting may be controlled by routing protocols. For instance, Protocol-Independent Multicast (PIM) is a family of multicast routing protocols that can provide one-to-many distribution of data over the Internet. In one example, PIM is used to create multicast distribution trees, which in turn are used to forward multicast data packets.

A source tree is a form of a multicast distribution tree that includes one or more nodes representing various devices. For instance, a source device of multicast traffic is located at a node corresponding to the root of the source tree, receiver device(s) are nodes located at the ends of the branches of the source tree, and middle device(s), if any, are nodes located between the root and receiver device(s). Multicast traffic, in some examples, travels from the source device through the tree toward one or more receiver devices. However, the traffic follows a strict path according to the source tree and multiple paths are not provided without modification(s). Thus, load balancing of multicast traffic is not possible in such cases and network bandwidth utilization may not be optimized (e.g., traffic is heavy over certain nodes while other nodes are underutilized).

In at least one embodiment, an overlay network treats nodes at the edge of the network fabric as tunnel endpoints. As a packet enters tunnel endpoint, the packet is encapsulated in accordance to the techniques described herein before it enters the network. As used herein, the phrase "network fabric" refers to a one or more network elements, forming a network, including switches, routers, servers, storage devices, or one or more components of a network device such as one or more network ports of a switch or router, etc.

Based on a given overlay network topology, multiple distribution trees for all tunnel endpoints are created in the overlay network. Each one of these distribution trees may be associated with a forwarding tag value (FTAG). In some examples, a number of distribution trees may depend on the network topology and be a tradeoff between protocol overhead and overall load balancing performance, etc.

In the case of an IP overlay network such as a Virtual Extensible LAN (VXLAN), there is currently no concept of multicast multipathing. Each tenant multicast group is mapped to an overlay multicast group, and the overlay multicast group would be routed at the IP layer in the same manner as in non-overlay cases. Therefore, the IP overlay network faces the same issue as the non-overlay case(s) and does not support multicast multipathing without modification(s).

In at least one embodiment, VXLAN is a standard network virtualization technology and works by creating a logical layer-2 network that is overlaid above a layer-3 IP network. Ethernet packets (e.g., generated by VMs) are encapsulated in an IP header before the packets are transported to a remote location where the IP header is removed and the original Ethernet packet is delivered to the destination. The IP encapsulation mechanism allows a logical layer-2 broadcast domain to be extended to an arbitrary number of remote locations, and allows different data centers or different sections of the same data center (and hence the VMs and devices therein) to be in the same layer-2 broadcast domain.

In at least one embodiment, when a tenant multicast packet (e.g., an original Ethernet frame including the multicast packet in the payload portion in an embodiment) initially enters a tunnel endpoint switch (e.g., a switch acting as a VXLAN Tunnel End Point in a given overlay network), one of the aforementioned distribution trees would be selected based on a hash of the flow information. Such flow information may include, but is not limited to, information in the header such as IP address (e.g., source and/or destination address), and/or other information not included in the IP header (but included elsewhere in the original Ethernet frame) such as UDP port number, TCP port number, etc. This approach may be similar to how a given switch performs load balancing unicast traffic onto different paths, except that a "path" is represented or defined by a distribution tree when performing multicasting. In addition to the distribution tree, the switch may look up the tenant multicast group information and derive an overlay multicast group as described in a given VXLAN.

Unlike a VXLAN implementation where the overlay multicast group directly maps into an overlay IP destination address (e.g., corresponding to a multicast group address in the overlay network), the switch in at least one embodiment would generate an IP destination address for the overlay network by concatenating the overlay multicast group value (e.g., a multicast group address in an example) with the selected FTAG value. In one example, the lower 4 bits of an outer IP destination address included in a VXLAN header is used as the selected FTAG value, which is then encapsulated onto the original Ethernet frame that includes the multicast packet. This effectively puts an explicit indication of which distribution tree this particular multicast packet should be forwarded on (e.g., the "path") throughout the overlay network.

The overlay multicast group therefore could be used to derive at least 2 pieces of information. The non-FTAG portion is used to derive a "fanout" list indicating where receivers exist for the multicast group in the overlay network. The FTAG portion is used to derive the "fanout" list of the multicast distribution tree which is used to prevent loops. These 2 fanout lists undergo an AND operation together to produce the final fanout list. In other words, the final fanout list would include interfaces where receivers exist and are part of the distribution tree.

Upon receiving an encapsulated packet, other switches in the overlay network may look up the overlay IP destination address and perform multicast replication of the packet (e.g., to forward the packet to respective destination(s)). Hashing of the encapsulated packet is not performed by these other switches. Because the FTAG is now part of the outer IP destination address in the VXLAN header, the fanout list can be derived base on the combination of FTAG and the overlay multicast group. In this manner, a single multicast packet is ensured to follow the path provided in a single distribution tree throughout the network to avoid a forwarding loop. Additionally, in some examples, an incoming interface pruning still applies similar to any multicast distribution mechanism to ensure the multicast is not replicated back to the source.

In order to avoid including duplicate overlay IP destination addresses in the forwarding table for the same overlay multicast group, the switch can implement a FTAG pruning mechanism. Before the IP destination address is used for a lookup in the forwarding table, the FTAG part of the IP destination address would be zeroed out first (e.g., to effectively remove the FTAG). Because the FTAG was removed from the IP destination address before lookup, the forwarding table only needs to have 1 entry per overlay multicast group. The result of this lookup would return a receiver fanout list (e.g., all potential receivers in the multicast group in an example) for this overlay multicast group irrespective of the FTAG (e.g., since the FTAG was effectively removed by being zeroed out). To ensure that the packet still follows the distribution tree associated with the FTAG, this receiver fanout list would be pruned based on the FTAG fanout list (e.g., the receiver fanout list would undergo an AND operation with the FTAG distribution tree fanout list) and the final result would be used for packet replication instead.

With the above-described mechanism, the subject technology may perform load balancing for multicast traffic into multiple distribution trees of an IP overlay network to fully utilize bandwidth available in the overlay network.

Example Network Environment

FIG. 1 shows an example network environment 100 including several network elements or nodes (e.g., network devices such as switches, routers, servers, storage device, etc.). In the example of FIG. 1, a client computer 111 ("A") represents a starting point for a multicast packet 110 ("Multicast Packet A") that is transmitted from the client computer 111 into a network fabric 105. Although the multicast packet 110 is mentioned in the discussion of FIG. 1, it is appreciated that other types of data traffic may be contemplated and still be within the scope of the subject technology. Further, in some embodiments, the multicast packet 110 may be included or encapsulated in other data, such as an Ethernet or VXLAN frame, etc., as discussed herein.

The network fabric 105 in FIG. 1 includes network elements 115, 120, 125, 130, 135, 140, 145 and 150 that form a network for forwarding the multicast packet 110 to its intended destination multicast group, including respective client computers representing a destination point for the multicast packet 110. For the sake of simplicity and for clarity of discussion, a single packet (and copies thereof) is described in the example of FIG. 1. However, it is appreciated that embodiments described herein are applicable to multiple packets that are transmitted from one or more source computers or devices and received, respectively, by one or more intended destination computers or devices.

In the example network fabric 105 of FIG. 1, the network elements 115, 120, 125, 130 and 150 represent "leaf" switches and may be considered tunnel endpoints, or as referred to in VXLAN terminology, a VXLAN Tunnel End Point (VTEP). The network elements 135, 140 and 145 may represent "spine" switches. As shown, the network elements included in the overlay network 107 form a bipartite graph in which every leaf switch connects to every spine switch and every spine switch connects to every leaf switch. It is appreciated that more network elements or less network elements may be provided and still be within the scope of the subject technology. Within the network fabric 105, one or more overlay networks may be provided such as an overlay network 107 that includes the network elements 115, 120, 125, 130, 135 and 140 (and does not include the network elements 145 and 150). As further shown, client computers 111 ("A"), 112 ("B"), 113 ("C"), 114 ("D") and 116 ("E") are respectively connected to the network elements 115, 120, 125, 130 and 150 representing different VTEPs.

As further illustrated in FIG. 1, the multicast packet 110 is transmitted into the network fabric 105 and received by the network element 115 corresponding to a respective leaf switch. In at least one embodiment, the network element 115, acting as the entry point into the network fabric 105, determines a multicast distribution tree (among a plurality of such trees) for forwarding the packet 115 through the overlay network 107. As mentioned before, multiple multicast distribution trees may be provided to forward multicast packet(s) through an overlay network. Each one of these multicast distribution trees may be associated with a forwarding tag value (FTAG) in at least one embodiment, which is further described below.

In the example overlay network 107 of FIG. 1, a first multicast distribution tree may include a spine switch corresponding to the network element 135 (e.g., a root node of the first tree) and include leaf switches corresponding to the network elements 115, 120, 125 and 130 (e.g., leaf nodes of the first tree) for delivering the multicast packet including the client computers 111 ("A"), 112 ("B"), 113 ("C") and 114 ("D").

A second multicast distribution tree may include a spine switch corresponding to the network element 140 (e.g., a root node of the second tree) and include leaf switches corresponding to the network elements 115, 120, 125 and 130 (e.g., leaf nodes of the second tree) for delivering the multicast packet including the client computers 111, 112, 113 and 114. Thus, in the example of FIG. 1, the multicast packet 110 may be distributed throughout the overlay network 107 using a respective distribution tree that defines a path for the multicast traffic to reach its intended receivers. Also note that the network elements 145 (spine switch) and 150 (leaf switch or VTEP) and the client computer 116 are not included in in the example overlay network 107 of FIG. 1 and a given distribution tree may not include the aforementioned network elements as part of its path.

Depending on the multicast distribution tree that is selected, the multicast packet 110 may be forwarded to different network elements in the network fabric 105 depending on which respective network elements are included in the selected distribution tree. For instance, in a first selected distribution tree, the multicast packet 110 may be forwarded along a first path ("Path 1") to the network element 135 representing a spine switch, and then sent to the network elements 120, 125, and 130 representing respective leaf switches. Alternatively, in a second selected distribution tree, the multicast packet 110 may be forwarded along a second path ("Path 2") to the network element 140 representing another spine switch and then sent to the network elements 120, 125 and 130 representing respective leaf switches. In the example first and second distributions trees described before, the network elements 120, 125 and 130 may represent respective leaf switches that considered a group of intended receivers of the multicast packet 110.

Figure 2:
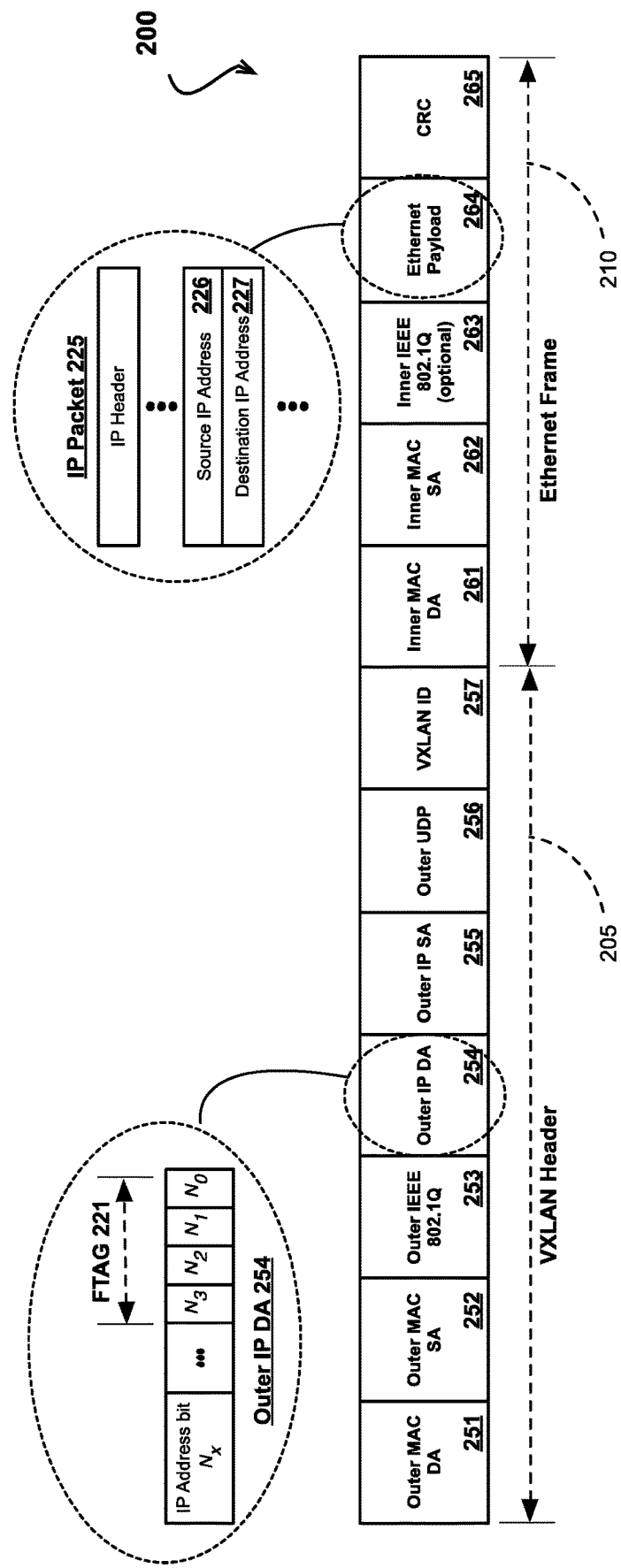
FIG. 2 is an example Ethernet frame that has been encapsulated with a VXLAN header in accordance with some embodiments of the subject technology.

In one example, the network element 115 receives an incoming multicast packet 110 from the client computer 111 (e.g., hosting a VM), for example an Ethernet frame that includes in its payload, an IP multicast packet, such as Ethernet frame 210 shown in FIG. 2. In this regard, FIG. 2 is an example Ethernet frame that has been encapsulated with a VXLAN header in accordance with some embodiments of the subject technology. FIG. 2 will be described by reference portions of FIG. 1 in the following discussion.

As shown in FIG. 2, the Ethernet frame 210 may include an inner MAC destination address (DA) 261, an inner MAC source address (SA) 262 for the source or sender of the Ethernet frame 210, an optional inner IEEE 802.1Q standard header 263, Ethernet payload 264, and a cyclic redundancy check (CRC) field 265. Referring back to FIG. 1, the multicast packet 110 (including the Ethernet frame 210 in FIG. 2) may have originated from the client computer 111, which in at least one embodiment, includes a virtual machine (VM) running on or hosted by the client computer 111.

As mentioned before, when the multicast packet 110 first enters a tunnel endpoint switch (e.g., an ingress switch acting as a VXLAN Tunnel End Point (VTEP)) in the overlay network 107, one of the aforementioned distribution trees can be selected based on a hash of "flow information" included in the Ethernet frame 210 corresponding to a "flow" of packets. In at least one embodiment, the aforementioned flow information may include, but is not limited to, information in the header such as IP address (e.g., source and/or destination address), UDP port number, TCP port number, etc.

Now referring to FIG. 2, the Ethernet payload included in the Ethernet frame 210 includes an IP packet 225, which further includes a source IP address 226 and a destination IP address 227 in an IP header. It is appreciated that the IP packet 225 may include other types of data and still be within the scope of the subject technology. For example, the IP header may include fields of information for data corresponding to version, traffic class, flow label, payload length, next header, hop limit, etc., or any other appropriate field included in an IPv4 or IPv6 header. Thus, a flow may be uniquely identified by a combination of a source IP address and a flow label in an example, and IP packets in the same flow will also have the same source IP address and the same flow label in at least one embodiment. Although the above example describes the inclusion of an IP packet in the Ethernet payload, it is appreciated that other types of packets may also be included. In an example, an L2 multi-destination packet may be included in the Ethernet payload.

In an example, the ingress switch corresponding to the network element 115 uses a hashing algorithm to determine which FTAG to include in a VXLAN header. The hashing algorithm may use any appropriate technique to generate a hash key based on the information provided in at least the IP header. In the example overlay network 107 of FIG. 1, two multi-destination or multicast distribution trees respectively correspond to a first FTAG value or a second FTAG value which each represent a unique ID associated to the respective multicast tree. For the purpose of the following discussion, it is assumed that a multicast distribution tree corresponding to "Path 1" as shown in FIG. 1 has been selected based on the generated hash key, and that the network element 135 corresponding to a spine switch represents a rode node of this multicast distribution tree.

Once the FTAG is determined and the multicast tree is selected, the network element 115 may proceed with encapsulating the Ethernet frame 210 in FIG. 2 with a VXLAN header. For example, the network element 115 appends to the Ethernet frame 210 a VXLAN header 260 as shown. In an embodiment, the VXLAN header 205 includes an outer MAC destination address (DA) 251, an outer MAC source address (SA) 252, an optional outer IEEE 802.1Q standard header 253, an outer IP destination address (DA) 254, an outer IP source address (SA) 255, an outer User Datagram Protocol (UDP) 256, and a VXLAN ID 257.

In at least one embodiment, the network element 115 may construct an IP destination address for the outer IP DA 254 by concatenating the overlay multicast group value (e.g., a multicast group address in an example) with the FTAG value. Referring to FIG. 2 now, a FTAG 221 represents 4 bits of information (e.g., for a total of 16 possible values in binary) corresponding to the multicast distribution tree (e.g., the selected path) at the lower end (e.g., least significant bits) of the outer IP DA 254. The remaining portion of the outer IP DA 254 represents the overlay multicast group address. As mentioned before, by using this technique, an explicit indication of which distribution tree this multicast packet should be forwarded on over the overlay network 107 is now included in the encapsulated multicast packet.

Referring to FIG. 1, once a FTAG is determined by the ingress leaf switch corresponding to the network element 115 and included in the encapsulated packet as part of the outer IP DA 254, the rest of the network elements in the overlay network 107 may forward the multicast packet 110 based on the selected FTAG. As mentioned before, the selected FTAG corresponds to a multicast distribution tree provided by the overlay network 107. Once the root switch receives the packet, it forwards it to all switches in that FTAG except the switch from which it was received. Referring to FIG. 1, the network element 115 representing the ingress leaf switch may then forward an encapsulated packet 117 to the network element 135 representing the root spine switch associated with the selected multicast tree based on the FTAG.

Upon receiving the encapsulated packet 177, the aforementioned root spine switch may then look up the overlay IP destination address (e.g., as included in the outer IP DA in the VXLAN header of the encapsulated packet 117) and perform multicast replication of the encapsulated packet 117 (e.g., to forward the packet to respective destination(s)). Hashing of the encapsulated packet is not performed by this root spine switch corresponding to the network element 135. Because the FTAG is now part of the outer IP destination address in the VXLAN header, the fanout list can be derived base on the combination of FTAG and the overlay multicast group. In this manner, a single multicast packet is ensured to follow the path provided in a single distribution tree throughout the network to avoid a forwarding loop. Additionally, in some examples, an incoming interface pruning still applies similar to any multicast distribution mechanism to ensure the multicast is not replicated back to the source.

Further, in order to avoid including duplicate overlay IP destination addresses in the forwarding table for the same overlay multicast group, the switch can implement a FTAG pruning mechanism. Before the IP destination address is used for a lookup in the forwarding table, the FTAG part of the IP destination address may be zeroed out first. Because the FTAG was removed from the IP destination address before lookup, the forwarding table only needs to have 1 entry per overlay multicast group. The result of this lookup would return a receiver fanout list for this overlay multicast group irrespective of the FTAG (e.g., since the FTAG was effectively removed by being zeroed out). To ensure that the packet still follows the distribution tree associated with the FTAG, this fanout list may be pruned based on the FTAG fanout list and the final result may be used for packet replication instead.

The overlay multicast group therefore could be used to derive a "fanout" list that indicates where receivers may exist in the overlay network 107. This fanout list may be masked with the FTAG fanout list and the packet may be replicated on the final unmasked ports, with an overlay VXLAN encapsulation.

Using at least information included in the fanout list and the forwarding table for the multicast distribution tree, the root spine switch corresponding to the network element 135 forwards the encapsulated packet 117 to respective leaf switches or VTEPs corresponding to the network elements 120, 125 and 130 of the overlay network 107. At each of the network elements 120, 125 and 130 corresponding to respective VTEPs, the encapsulated packet 117 may be decapsulated (e.g., by removing the VXLAN header) to provide a copy of the multicast packet (e.g., as included in the original Ethernet frame discussed above) and then forwarded to the clients computers 112, 113, and 114 that represent receivers of the multicast packet. In this regard, each leaf switch or VTEP looks at the VXLAN header in the encapsulated packet, and if the value of VXLAN ID in the header matches with the configured VXLAN segment VNID of the VTEP (e.g., the logical Layer 2 network ID of the VTEP), the leaf switch removes the encapsulation header and delivers the packet to client computer that is a hop away such as one of the client computers 112, 113 or 114 in the example of FIG. 1.

Example Processes

Figure 3:
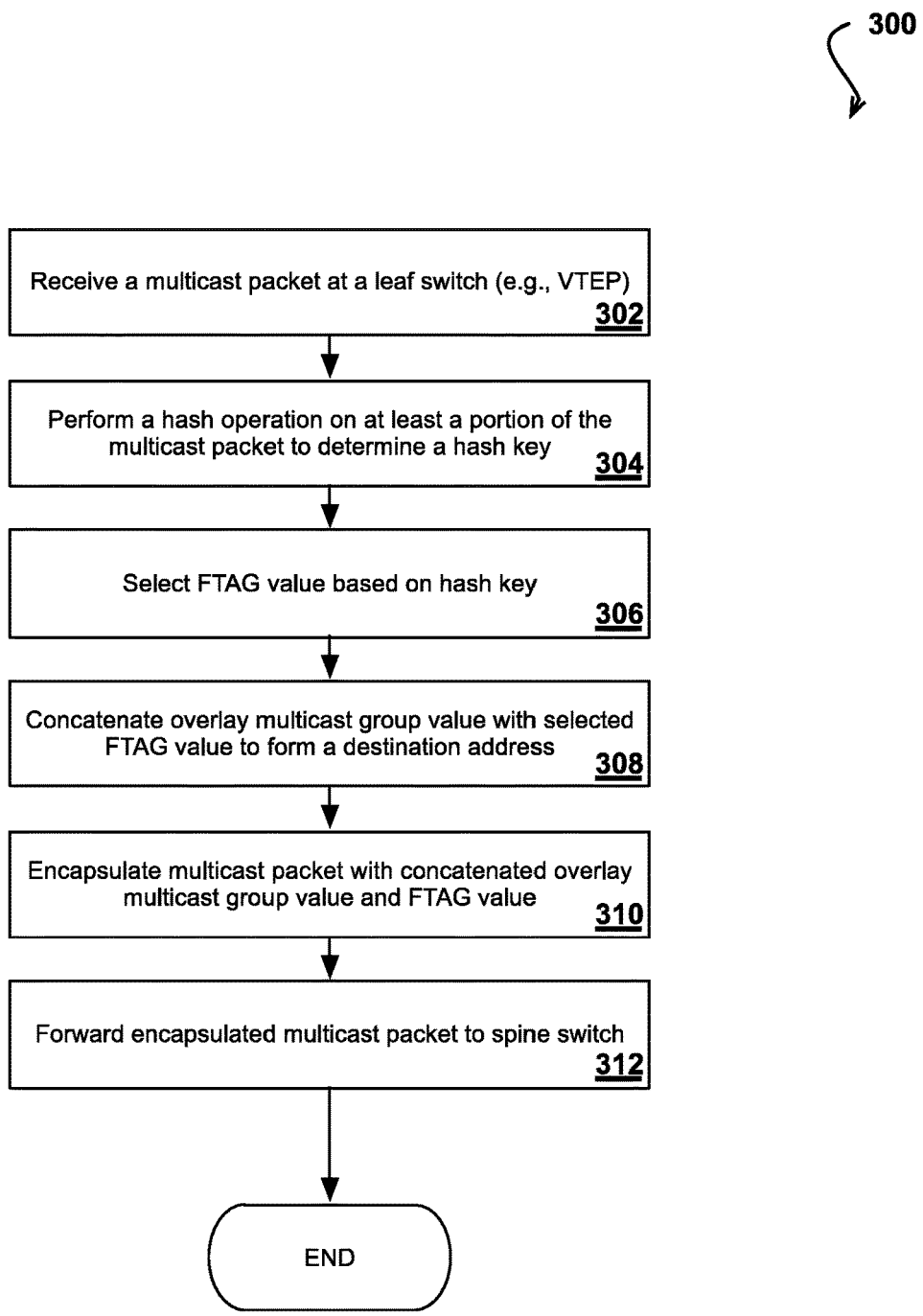
FIG. 3 conceptually illustrates an example process to provide multipath multicasting upon receiving a multicast packet at an ingress leaf switch in accordance with some embodiments of the subject technology.

FIG. 3 conceptually illustrates an example process 300 to provide multipath multicasting upon receiving a multicast packet at an ingress leaf switch in accordance with some embodiments of the subject technology. Referring to FIG. 1, the process 300 described below may be performed by an ingress leaf switch, such as the network element 115 that receives the incoming multicast packet 110 as described before.

At step 302, a multicast packet is received at a leaf switch corresponding to a VTEP in an overlay network. As mentioned before, the multicast packet may be included in a payload portion of an original Ethernet frame in an embodiment. At step 304, a hash operation is performed on at least a portion of the multicast packet to determine a hash key. For example, the hash operation may be performed on a portion of an IP header indicating flow information such as, but not limited to, an IP destination and/or source address, or information indicated a UDP and/or TCP port number among other types of information. At step 306, a FTAG value is selected based on the hash key. The FTAG value may corresponding to a respective multicast distribution tree in the overlay network. At step 308, an overlay multicast group value (e.g., multicast group address in the overlay network) is concatenated with the FTAG value to form a destination address. At step 310, the multicast packet is encapsulated with at least the concatenated overlay multicast group value and the FTAG value. As mentioned before, a VXLAN header may be appended to the original Ethernet frame including the multicast packet. A field corresponding to an outer IP destination address may be updated to include the value of the concatenated overlay multicast group value and the FTAG value in which the lower 4 bits of the outer IP destination address corresponds to the FTAG value. At step 312, the encapsulated packet is forwarded from the leaf switch to a spine switch (e.g., a root node of the multicast distribution tree corresponding to the FTAG value). In an embodiment, the spine switch is a device or network element at a next-hop from the leaf switch in the overlay network.

Figure 4:
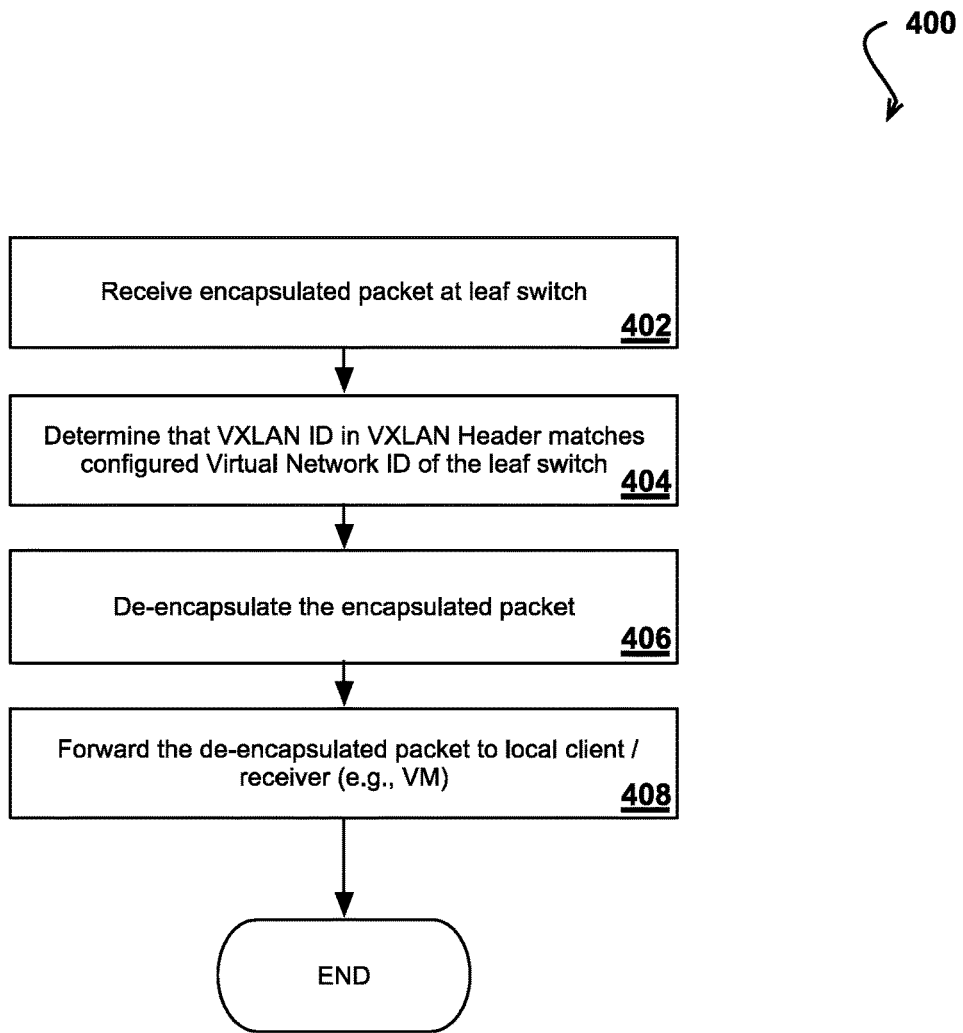
FIG. 4 conceptually illustrates an example process for de-encapsulating an encapsulated packet received at a leaf switch in accordance with some embodiments of the subject technology.

FIG. 4 conceptually illustrates an example process 400 for de-encapsulating an encapsulated packet received at a leaf switch in accordance with some embodiments of the subject technology.

At step 402, an encapsulated packet is received at a leaf switch. In an example, the encapsulated packet may be forwarded from a root spine switch to the leaf switch that represents a VTEP in an overlay network. At step 404, it is determined that VXLAN ID in a VXLAN header of the encapsulated packet matches a configured Virtual Network ID of the leaf switch. At step 406, the encapsulated packet is decapsulated by at least removing the VXLAN header. On the VXLAN header is removed, the decapsulated packet may include an original Ethernet frame that has the multicast packet in its payload portion. At step 408, the decapsulated packet is forwarded to a local client computer/receiver (e.g., VM), which may be one-hop away from the leaf switch.

Example Devices, Systems and Architectures

Figure 5:
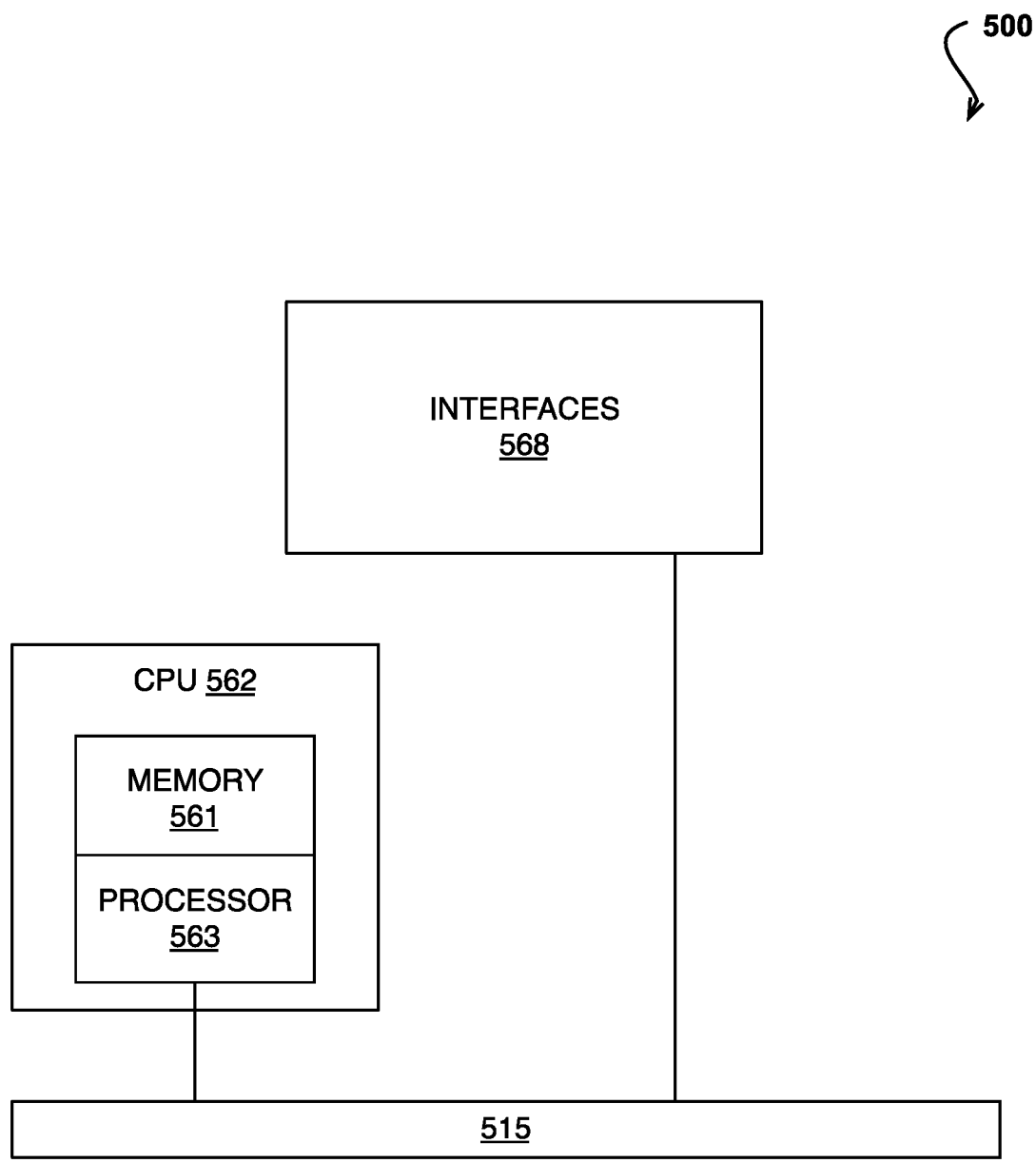
FIG. 5 illustrates an example network device according to some aspects of the subject technology.

FIG. 5 illustrates an exemplary network device 510 suitable for implementing the present invention. Network device 510 includes a master central processing unit (CPU) 562, interfaces 568, and a bus 515 (e.g., a PCI bus). When acting under the control of appropriate software or firmware, the CPU 562 is responsible for executing packet management, error detection, and/or routing functions, such as miscabling detection functions, for example. The CPU 562 preferably accomplishes all these functions under the control of software including an operating system and any appropriate applications software. CPU 562 may include one or more processors 563 such as a processor from the Motorola family of microprocessors or the MIPS family of microprocessors. In an alternative embodiment, processor 563 is specially designed hardware for controlling the operations of router 510. In a specific embodiment, a memory 561 (such as non-volatile RAM and/or ROM) also forms part of CPU 562. However, there are many different ways in which memory could be coupled to the system.

The interfaces 568 are typically provided as interface cards (sometimes referred to as "line cards"). Generally, they control the sending and receiving of data packets over the network and sometimes support other peripherals used with the router 510. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 562 to efficiently perform routing computations, network diagnostics, security functions, etc.

Although the system shown in FIG. 5 is one specific network device of the present invention, it is by no means the only network device architecture on which the present invention can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 561) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

Figure 6A:
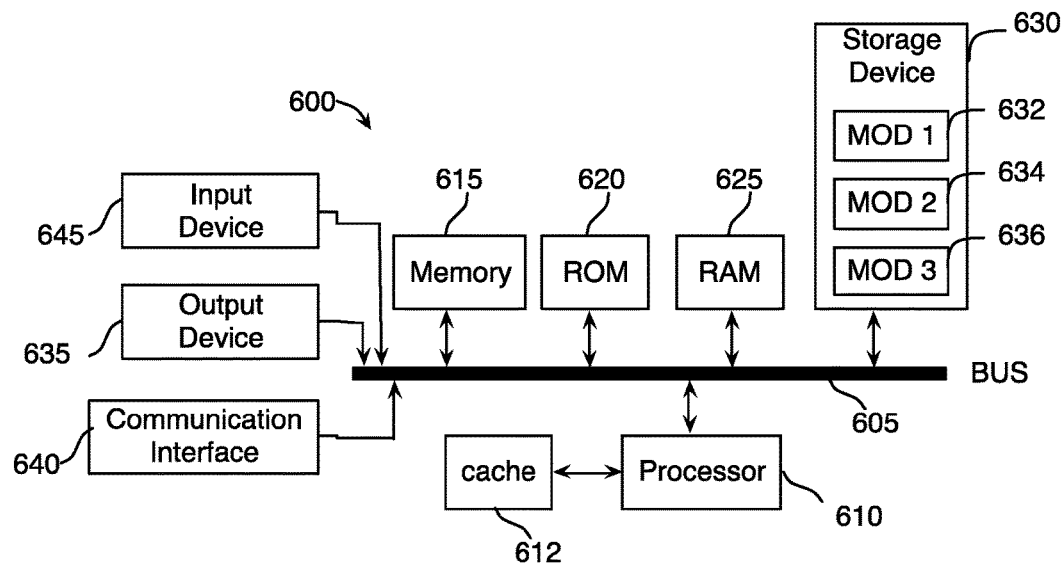
FIGS. 6A and 6B illustrate example system embodiments according to some aspects of the subject technology.
Figure 6B:
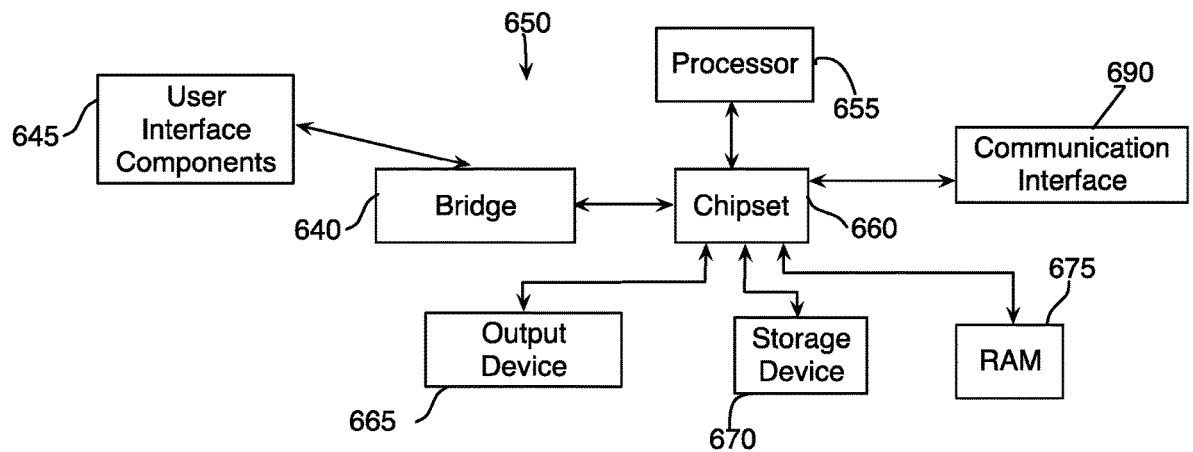

FIG. 6A, and FIG. 6B illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 6A illustrates a conventional system bus computing system architecture 600 wherein the components of the system are in electrical communication with each other using a bus 605. Exemplary system 600 includes a processing unit (CPU or processor) 610 and a system bus 605 that couples various system components including the system memory 615, such as read only memory (ROM) 620 and random access memory (RAM) 625, to the processor 610.

The system 600 can include a cache of high-speed memory connected directly with, in close proximity to, or integrated as part of the processor 610. The system 600 can copy data from the memory 615 and/or the storage device 630 to the cache 612 for quick access by the processor 610. In this way, the cache can provide a performance boost that avoids processor 610 delays while waiting for data. These and other modules can control or be configured to control the processor 610 to perform various actions. Other system memory 615 may be available for use as well. The memory 615 can include multiple different types of memory with different performance characteristics. The processor 610 can include any general purpose processor and a hardware module or software module, such as module 1 632, module 6 634, and module 3 636 stored in storage device 630, configured to control the processor 610 as well as a special-purpose processor where software instructions are incorporated into the actual processor design. The processor 610 may essentially be a completely self-contained computing system, containing multiple cores or processors, a bus, memory controller, cache, etc. A multi-core processor may be symmetric or asymmetric.

To enable user interaction with the computing device 600, an input device 645 can represent any number of input mechanisms, such as a microphone for speech, a touch-sensitive screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing device 600. The communications interface 640 can generally govern and manage the user input and system output. There is no restriction on operating on any particular hardware arrangement and therefore the basic features here may easily be substituted for improved hardware or firmware arrangements as they are developed.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 625, read only memory (ROM) 620, and hybrids thereof.

The storage device 630 can include software modules 632, 634, 636 for controlling the processor 610. Other hardware or software modules are contemplated. The storage device 630 can be connected to the system bus 605. In one aspect, a hardware module that performs a particular function can include the software component stored in a computer-readable medium in connection with the necessary hardware components, such as the processor 610, bus 605, display 635, and so forth, to carry out the function.

FIG. 6B illustrates a computer system 650 having a chipset architecture that can be used in executing the described method and generating and displaying a graphical user interface (GUI). Computer system 650 is an example of computer hardware, software, and firmware that can be used to implement the disclosed technology. System 650 can include a processor 655, representative of any number of physically and/or logically distinct resources capable of executing software, firmware, and hardware configured to perform identified computations. Processor 655 can communicate with a chipset 660 that can control input to and output from processor 655. In this example, chipset 660 outputs information to output 665, such as a display, and can read and write information to storage device 670, which can include magnetic media, and solid state media, for example. Chipset 660 can also read data from and write data to RAM 675. A bridge 680 for interfacing with a variety of user interface components 685 can be provided for interfacing with chipset 660. Such user interface components 685 can include a keyboard, a microphone, touch detection and processing circuitry, a pointing device, such as a mouse, and so on. In general, inputs to system 650 can come from any of a variety of sources, machine generated and/or human generated.

Chipset 660 can also interface with one or more communication interfaces 690 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 655 analyzing data stored in storage 670 or 675. Further, the machine can receive inputs from a user via user interface components 685 and execute appropriate functions, such as browsing functions by interpreting these inputs using processor 655.

It can be appreciated that exemplary systems 600 and 650 can have more than one processor 610 or be part of a group or cluster of computing devices networked together to provide greater processing capability.

Figure 7:
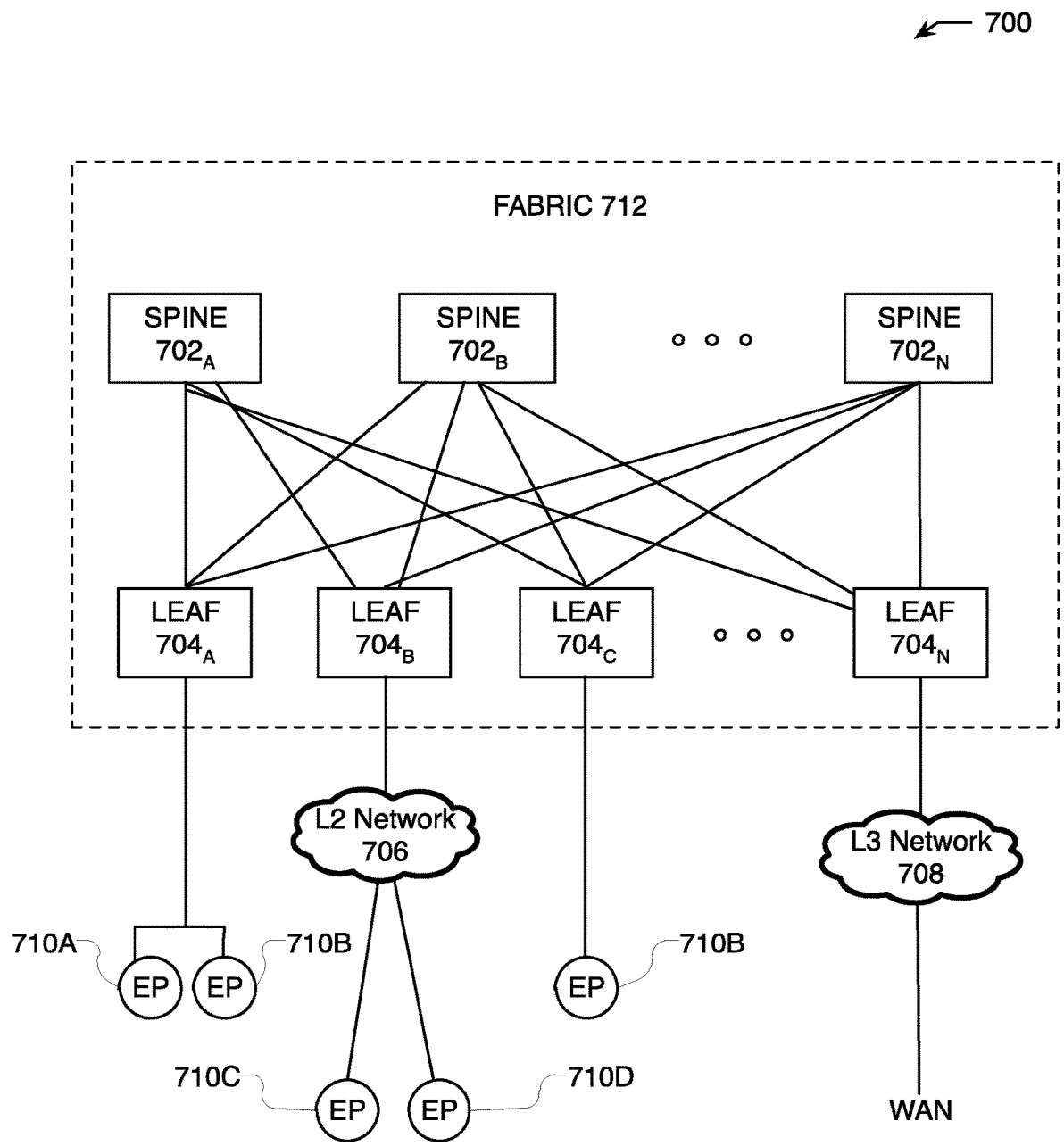
FIG. 7 illustrates a schematic block diagram of an example architecture for a network fabric.

FIG. 7 illustrates a schematic block diagram of an example architecture 700 for a network fabric 712. The network fabric 712 can include spine switches 702A, 702B, . . . , 702N (collectively "702") connected to leaf switches 704A, 704B, 704C, . . . , 704N (collectively "704") in the network fabric 712.

Spine switches 702 can be L3 switches in the fabric 712. However, in some cases, the spine switches 702 can also, or otherwise, perform L2 functionalities. Further, the spine switches 702 can support various capabilities, such as 40 or 10 Gbps Ethernet speeds. To this end, the spine switches 702 can include one or more 40 Gigabit Ethernet ports. Each port can also be split to support other speeds. For example, a 40 Gigabit Ethernet port can be split into four 10 Gigabit Ethernet ports.

In some embodiments, one or more of the spine switches 702 can be configured to host a proxy function that performs a lookup of the endpoint address identifier to locator mapping in a mapping database on behalf of leaf switches 704 that do not have such mapping. The proxy function can do this by parsing through the packet to the encapsulated, tenant packet to get to the destination locator address of the tenant. The spine switches 702 can then perform a lookup of their local mapping database to determine the correct locator address of the packet and forward the packet to the locator address without changing certain fields in the header of the packet.

When a packet is received at a spine switch 702i, the spine switch 702i can first check if the destination locator address is a proxy address. If so, the spine switch 702i can perform the proxy function as previously mentioned. If not, the spine switch 702i can lookup the locator in its forwarding table and forward the packet accordingly.

Spine switches 702 connect to leaf switches 704 in the fabric 712. Leaf switches 704 can include access ports (or non-fabric ports) and fabric ports. Fabric ports can provide uplinks to the spine switches 702, while access ports can provide connectivity for devices, hosts, endpoints, VMs, or external networks to the fabric 712.

Leaf switches 704 can reside at the edge of the fabric 712, and can thus represent the physical network edge. In some cases, the leaf switches 704 can be top-of-rack ("ToR") switches configured according to a ToR architecture. In other cases, the leaf switches 704 can be aggregation switches in any particular topology, such as end-of-row (EoR) or middle-of-row (MoR) topologies. The leaf switches 704 can also represent aggregation switches, for example.

The leaf switches 704 can be responsible for routing and/or bridging the tenant packets and applying network policies. In some cases, a leaf switch can perform one or more additional functions, such as implementing a mapping cache, sending packets to the proxy function when there is a miss in the cache, encapsulate packets, enforce ingress or egress policies, etc.

Moreover, the leaf switches 704 can contain virtual switching functionalities, such as a virtual tunnel endpoint (VTEP) function as explained below in the discussion of VTEP 408 in FIG. 4. To this end, leaf switches 704 can connect the fabric 712 to an overlay network, such as overlay network 400 illustrated in FIG. 7.

Network connectivity in the fabric 712 can flow through the leaf switches 704. Here, the leaf switches 704 can provide servers, resources, endpoints, external networks, or VMs access to the fabric 712, and can connect the leaf switches 704 to each other. In some cases, the leaf switches 704 can connect EPGs to the fabric 712 and/or any external networks. Each EPG can connect to the fabric 712 via one of the leaf switches 704, for example.

Endpoints 710A-E (collectively "710") can connect to the fabric 712 via leaf switches 704. For example, endpoints 710A and 710B can connect directly to leaf switch 704A, which can connect endpoints 710A and 710B to the fabric 712 and/or any other one of the leaf switches 704. Similarly, endpoint 710E can connect directly to leaf switch 704C, which can connect endpoint 710E to the fabric 712 and/or any other of the leaf switches 704. On the other hand, endpoints 710C and 710D can connect to leaf switch 704B via L2 network 706. Similarly, the wide area network (WAN) can connect to the leaf switches 704C or 704D via L3 network 708.

Endpoints 710 can include any communication device, such as a computer, a server, a switch, a router, etc. In some cases, the endpoints 710 can include a server, hypervisor, or switch configured with a VTEP functionality which connects an overlay network, such as overlay network 400 below, with the fabric 712. For example, in some cases, the endpoints 710 can represent one or more of the VTEPs 408A-D illustrated in FIG. 4. Here, the VTEPs 408A-D can connect to the fabric 712 via the leaf switches 704. The overlay network can host physical devices, such as servers, applications, EPGs, virtual segments, virtual workloads, etc. In addition, the endpoints 710 can host virtual workload(s), clusters, and applications or services, which can connect with the fabric 712 or any other device or network, including an external network. For example, one or more endpoints 710 can host, or connect to, a cluster of load balancers or an EPG of various applications.

Although the fabric 712 is illustrated and described herein as an example leaf-spine architecture, one of ordinary skill in the art will readily recognize that the subject technology can be implemented based on any network fabric, including any data center or cloud network fabric. Indeed, other architectures, designs, infrastructures, and variations are contemplated herein.

Figure 8:
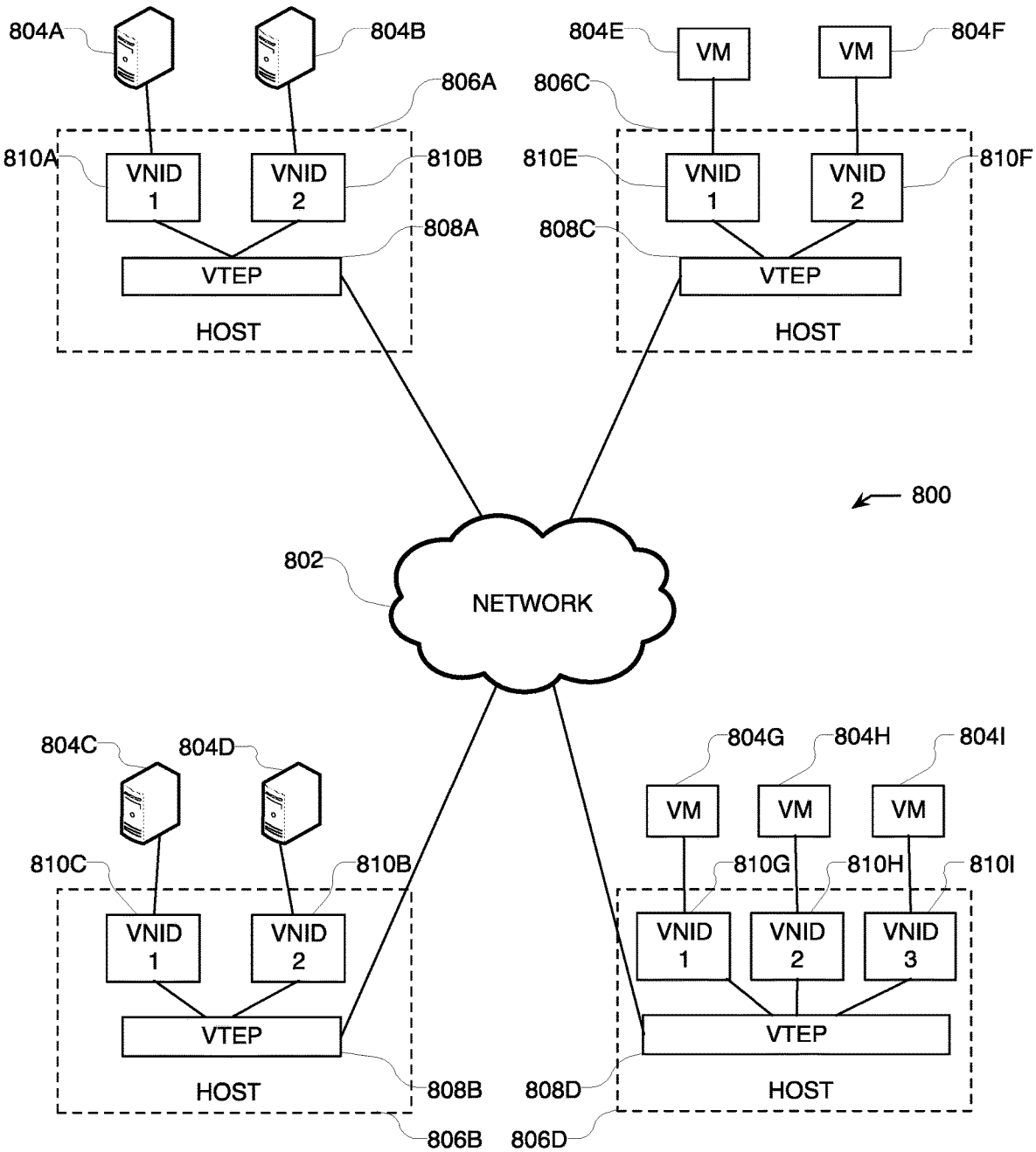
FIG. 8 illustrates an example overlay network.

FIG. 8 illustrates an exemplary overlay network 800. Overlay network 800 uses an overlay protocol, such as VXLAN, VGRE, VO3, or STT, to encapsulate traffic in L2 and/or L3 packets which can cross overlay L3 boundaries in the network. As illustrated in FIG. 8, overlay network 800 can include hosts 806A-D interconnected via network 802.

Network 802 can include a packet network, such as an IP network, for example. Moreover, network 802 can connect the overlay network 800 with the fabric 312 in FIG. 3. For example, VTEPs 808A-D can connect with the leaf switches 304 in the fabric 312 via network 802.

Hosts 806A-D include virtual tunnel end points (VTEP) 808A-D, which can be virtual nodes or switches configured to encapsulate and decapsulate data traffic according to a specific overlay protocol of the network 800, for the various virtual network identifiers (VNIDs) 810A-I. Moreover, hosts 806A-D can include servers containing a VTEP functionality, hypervisors, and physical switches, such as L3 switches, configured with a VTEP functionality. For example, hosts 806A and 806B can be physical switches configured to run VTEPs 808A-B. Here, hosts 806A and 806B can be connected to servers 804A-D, which, in some cases, can include virtual workloads through VMs loaded on the servers, for example.

In some embodiments, network 800 can be a VXLAN network, and VTEPs 808A-D can be VXLAN tunnel end points. However, as one of ordinary skill in the art will readily recognize, network 800 can represent any type of overlay or software-defined network, such as NVGRE, STT, or even overlay technologies yet to be invented.

The VNIDs can represent the segregated virtual networks in overlay network 800. Each of the overlay tunnels (VTEPs 808A-D) can include one or more VNIDs. For example, VTEP 808A can include VNIDs 1 and 2, VTEP 808B can include VNIDs 1 and 3, VTEP 808C can include VNIDs 1 and 2, and VTEP 808D can include VNIDs 1-3. As one of ordinary skill in the art will readily recognize, any particular VTEP can, in other embodiments, have numerous VNIDs, including more than the 3 VNIDs illustrated in FIG. 8.

The traffic in overlay network 800 can be segregated logically according to specific VNIDs. This way, traffic intended for VNID 1 can be accessed by devices residing in VNID 1, while other devices residing in other VNIDs (e.g., VNIDs 2 and 3) can be prevented from accessing such traffic. In other words, devices or endpoints connected to specific VNIDs can communicate with other devices or endpoints connected to the same specific VNIDs, while traffic from separate VNIDs can be isolated to prevent devices or endpoints in other specific VNIDs from accessing traffic in different VNIDs.

Servers 804A-D and VMs 804E-I can connect to their respective VNID or virtual segment, and communicate with other servers or VMs residing in the same VNID or virtual segment. For example, server 804A can communicate with server 804C and VMs 804E and 804G because they all reside in the same VNID, viz., VNID 1. Similarly, server 804B can communicate with VMs 804F, H because they all reside in VNID 2. VMs 804E-I can host virtual workloads, which can include application workloads, resources, and services, for example. However, in some cases, servers 804A-D can similarly host virtual workloads through VMs hosted on the servers 804A-D. Moreover, each of the servers 804A-D and VMs 804E-I can represent a single server or VM, but can also represent multiple servers or VMs, such as a cluster of servers or VMs.

VTEPs 808A-D can encapsulate packets directed at the various VNIDs 1-3 in the overlay network 800 according to the specific overlay protocol implemented, such as VXLAN, so traffic can be properly transmitted to the correct VNID and recipient(s). Moreover, when a switch, router, or other network device receives a packet to be transmitted to a recipient in the overlay network 800, it can analyze a routing table, such as a lookup table, to determine where such packet needs to be transmitted so the traffic reaches the appropriate recipient. For example, if VTEP 808A receives a packet from endpoint 804B that is intended for endpoint 804H, VTEP 808A can analyze a routing table that maps the intended endpoint, endpoint 804H, to a specific switch that is configured to handle communications intended for endpoint 804H. VTEP 808A might not initially know, when it receives the packet from endpoint 804B, that such packet should be transmitted to VTEP 808D in order to reach endpoint 804H. Accordingly, by analyzing the routing table, VTEP 808A can lookup endpoint 804H, which is the intended recipient, and determine that the packet should be transmitted to VTEP 808D, as specified in the routing table based on endpoint-to-switch mappings or bindings, so the packet can be transmitted to, and received by, endpoint 804H as expected.

However, continuing with the previous example, in many instances, VTEP 808A may analyze the routing table and fail to find any bindings or mappings associated with the intended recipient, e.g., endpoint 804H. Here, the routing table may not yet have learned routing information regarding endpoint 804H. In this scenario, the VTEP 808A may likely broadcast or multicast the packet to ensure the proper switch associated with endpoint 804H can receive the packet and further route it to endpoint 804H.

In some cases, the routing table can be dynamically and continuously modified by removing unnecessary or stale entries and adding new or necessary entries, in order to maintain the routing table up-to-date, accurate, and efficient, while reducing or limiting the size of the table.

As one of ordinary skill in the art will readily recognize, the examples and technologies provided above are simply for clarity and explanation purposes, and can include many additional concepts and variations.

As one of ordinary skill in the art will readily recognize, the examples and technologies provided above are simply for clarity and explanation purposes, and can include many additional concepts and variations.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

What is claimed is:

1. A system comprising:
   one or more processors;
   a network interface coupled to the one or more processors; and
   a non-transitory memory coupled to the one or more processors, the non-transitory memory including instructions that, when executed by the one or more processors, cause the one or more processors to:
      receive, over the network interface, a packet for distributing to a set of receivers in a network;
      perform a hash operation on at least a portion of the packet to determine a hash key;
      select a forwarding value based at least on the hash key; and
      concatenate the forwarding value with a group value to yield a concatenated value.

2. The system of claim 1, comprising further instructions for hash operations, which when executed by the one or more processors, causes the one or more processors to:
   encapsulate the packet with the concatenated value and the forwarding value to yield an encapsulated packet; and
   forward the encapsulated packet to a network element located at a next-hop in the network.

3. The system of claim 1, wherein the packet is received by a virtual extensible local area network (VXLAN) tunnel end point (VTEP) in the network.

4. The system of claim 1, wherein the hash operation is performed on at least one of an IP destination address or an IP source address in an IP header of the packet, information in an layer 2 (L2) header, or information in the packet indicating a user datagram protocol (UDP) port number or a transmission control protocol (TCP) port number.

5. The system of claim 1,
wherein,
the forwarding value is associated with a multicast distribution tree, and
the multicast distribution tree is selected from a plurality of multicast distribution trees in the network.

6. The system of claim 1, wherein the concatenated value comprises an address.

7. The system of claim 6, wherein the forwarding value comprises a lower four bits of a header field including the concatenated value.

8. A computer-implemented method comprising:
receiving, over a network interface, a packet for distributing to a set of receivers in a network;
performing a hash operation on at least a portion of the packet to determine a hash key;
selecting a forwarding value based at least on the hash key; and
concatenating a group value with the forwarding value to yield a concatenated value.

9. The computer-implemented method of claim 8, further comprising:
encapsulating the packet with the concatenated value and the forwarding value to yield an encapsulated packet; and
forwarding the encapsulated packet to a network element located at a next-hop in the network.

10. The computer-implemented method of claim 8, wherein the packet is received by a virtual extensible local area network (VXLAN) tunnel end point (VTEP) in the network.

11. The computer-implemented method of claim 8, wherein the hash operation is performed on at least one of an IP destination address or an IP source address in an IP header of the packet, information in an layer 2 (L2) header, or information in the packet indicating a user datagram protocol (UDP) port number or a transmission control protocol (TCP) port number.

12. The computer-implemented method of claim 8, wherein a multicast distribution tree is selected from a plurality of multicast distribution trees in the network.

13. The computer-implemented method of claim 8, wherein the concatenated value comprises an address.

14. The computer-implemented method of claim 13, wherein the forwarding value comprises a lower four bits of a header field including the concatenated value.

15. At least one non-transitory computer-readable medium including instructions stored therein that, when executed by at least one computing device, cause the at least one computing device to:
receive, over a network interface, a packet for distributing to a set of receivers in a network;
perform a hash operation on at least a portion of the packet to determine a hash key;
select a forwarding tag (FTAG) value based at least on the hash key, wherein the FTAG value is associated with a multicast distribution tree in the network; and
concatenate a group value with the FTAG value to yield a concatenated value.

16. The non-transitory computer-readable medium of claim 15, comprising further instructions for hash operations, which when executed by the one or more processors, causes the one or more processors to:
encapsulate the packet with the concatenated value and the FTAG value to yield an encapsulated packet; and
forward the encapsulated packet to a network element located at a next-hop in the network.

17. The non-transitory computer-readable medium of claim 15, wherein the packet is received by a virtual extensible local area network (VXLAN) tunnel end point (VTEP) in the network.

18. The non-transitory computer-readable medium of claim 15, wherein the hash operation is performed on at least one of an IP destination address or an IP source address in an IP header of the packet, information in an layer 2 (L2) header, or information in the packet indicating a user datagram protocol (UDP) port number or a transmission control protocol (TCP) port number.

19. The non-transitory computer-readable medium of claim 15, wherein the multicast distribution tree is selected from a plurality of multicast distribution trees in the network.

20. The non-transitory computer-readable medium of claim 15, wherein the concatenated value comprises an address.

* * * * *